(12) United States Patent
Kariotoglou et al.

(10) Patent No.: US 11,683,589 B2
(45) Date of Patent: Jun. 20, 2023

(54) AUTOMATIC CAMERA HEAD AND OPERATION METHOD

(71) Applicant: ETH Zurich, Zürich (CH)

(72) Inventors: Nikolaos Kariotoglou, Zürich (CH); Reto Hofmann, Sutz (CH)

(73) Assignee: ETH Zurich, Zurich (CH)

( * ) Notice: Subject to any disclaimer, the term of this patent is extended or adjusted under 35 U.S.C. 154(b) by 0 days.

(21) Appl. No.: 17/049,271

(22) PCT Filed: Apr. 23, 2019

(86) PCT No.: PCT/IB2019/053323
§ 371 (c)(1),
(2) Date: Oct. 20, 2020

(87) PCT Pub. No.: WO2019/207470
PCT Pub. Date: Oct. 31, 2019

(65) Prior Publication Data
US 2021/0258493 A1    Aug. 19, 2021

(30) Foreign Application Priority Data

Apr. 24, 2018   (CH) .................................... 00526/18

(51) Int. Cl.
*H04N 23/695*  (2023.01)
*G06T 7/80*    (2017.01)
*G03B 17/56*   (2021.01)
*H04N 17/00*   (2006.01)
*H04N 23/62*   (2023.01)

(52) U.S. Cl.
CPC ......... *H04N 23/695* (2023.01); *G03B 17/561* (2013.01); *G06T 7/80* (2017.01); *H04N 17/002* (2013.01); *H04N 23/62* (2023.01); *G06T 2207/10016* (2013.01); *G06T 2207/30244* (2013.01)

(58) Field of Classification Search
CPC .......... H04N 5/23299; H04N 5/23216; H04N 17/002; G03B 17/561; G06T 7/80; G06T 2207/10016; G06T 2207/30244; B25J 9/1689; G05B 2219/40617
USPC ........................................................ 348/187
See application file for complete search history.

(56) References Cited

U.S. PATENT DOCUMENTS

| 4,697,231 A | 9/1987 | Boytor et al. |
| 5,111,288 A * | 5/1992 | Blackshear ...... G08B 13/19619 348/143 |

(Continued)

FOREIGN PATENT DOCUMENTS

| CN | 204462869 U | * 7/2015 |
| CN | 105144695 A | 12/2015 |

(Continued)

OTHER PUBLICATIONS

International Search Report & Written Opinion for PCT/IB2019/053323, dated May 5, 2020, 17 pages.

*Primary Examiner* — Michael Lee
(74) *Attorney, Agent, or Firm* — Blank Rome LLP

(57) ABSTRACT

An automatic camera head for panning and tilting a video camera, comprising at least one ring actuator arranged to act on a ring control of an objective of the camera, wherein said ring control is one of: zoom, iris, and focus; and said ring actuator includes a torque measurement unit delivering a signal indicative of the torque applied to the ring control.

15 Claims, 4 Drawing Sheets

(56) References Cited

U.S. PATENT DOCUMENTS

| | | | |
|---|---|---|---|
| 6,977,678 B1 * | 12/2005 | Wada | H04N 5/23203 |
| | | | 348/211.99 |
| 10,298,846 B2 | 5/2019 | Webb et al. | |
| 2007/0115356 A1 * | 5/2007 | Kang | G06T 7/32 |
| | | | 348/143 |
| 2007/0237417 A1 | 10/2007 | Agrawal | |
| 2008/0055409 A1 * | 3/2008 | Mars | G08B 13/1963 |
| | | | 348/143 |
| 2011/0310219 A1 * | 12/2011 | Kim | H04N 5/247 |
| | | | 348/36 |
| 2013/0169196 A1 * | 7/2013 | Markham | H02P 6/181 |
| | | | 318/3 |
| 2013/0336645 A1 * | 12/2013 | Chapman | G03B 17/561 |
| | | | 396/428 |
| 2014/0028844 A1 * | 1/2014 | Osawa | H04N 7/183 |
| | | | 348/143 |
| 2015/0356841 A1 * | 12/2015 | Lim | G08B 29/046 |
| | | | 348/143 |
| 2017/0146892 A1 * | 5/2017 | Wei | G03B 17/563 |
| 2017/0261836 A1 * | 9/2017 | Wada | G03B 17/561 |
| 2017/0289456 A1 | 10/2017 | David | |
| 2018/0342137 A1 * | 11/2018 | Lee | G06T 7/13 |

FOREIGN PATENT DOCUMENTS

| | | | | |
|---|---|---|---|---|
| DE | 102015115676 A1 * | 3/2017 | | |
| JP | 2008/124655 A | 5/2008 | | |
| JP | 2015/121667 A | 7/2015 | | |
| JP | 2017/102138 A | 6/2017 | | |
| JP | 2017/111305 A | 6/2017 | | |
| WO | WO-02/097528 A1 | 12/2002 | | |
| WO | WO-2009145401 A1 * | 12/2009 | | F16M 11/10 |

* cited by examiner

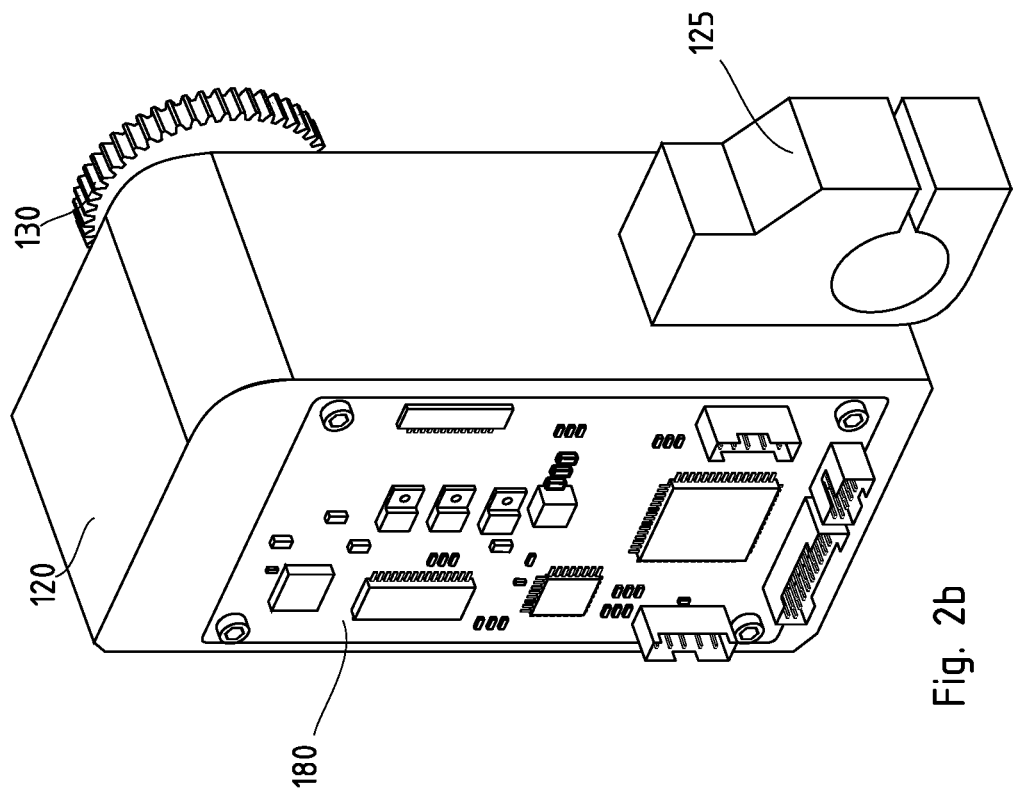
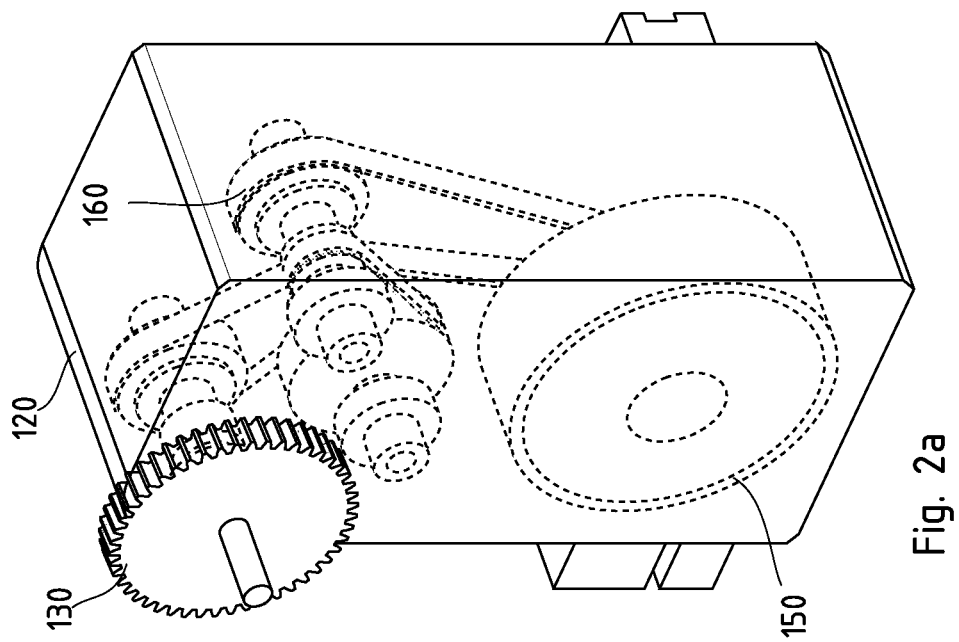

AUTOMATIC CAMERA HEAD AND OPERATION METHOD

RELATED APPLICATIONS

This application is a national phase application of PCT/IB2019/053323, filed Apr. 23, 2019, which claims the benefit of Swiss Patent Application No. CH 00526/18, filed on Apr. 24, 2018. The entire contents of those applications are hereby incorporated by reference.

FIELD OF THE INVENTION

The present invention concerns a system for filming automatically moving objects with robotized cameras.

DESCRIPTION OF RELATED ART

Algorithms designed to automatically film moving objects using cameras attached to robotic equipment struggle to achieve the same performance of human operators in dynamically changing scenes. The main visible problems are:
a) "Robotic" movement of cameras,
b) Unnecessary movements
c) Too slow reaction to a scene
d) No adaptation to things that are obvious to humans
e) Audible movement of robot parts picked up by camera microphones.

An object of the present invention is the provision of

Professional automatic cameras may have, in addition to actuators to pan and tilt the camera, also one or several actuators connected to control a setting of the camera optics, like for example the lens aperture (iris), the focal length (zoom), or the focus distance, or any other meaningful setting of the camera or of an objective connected to the camera. Such actuators are often denoted as "ring actuators", referring to the conventional form of such controls, and this practice will be followed in the following description and claims, but the invention may include variants in which a "ring actuator" acts on a control that is not ring-shaped.

Precise actuation of the ring controls is often a weak point of conventional automatic cameras. An important aspect of the present invention lies in the accuracy of these operations.

BRIEF SUMMARY OF THE INVENTION

According to the invention, these aims are achieved by the system herein described and claimed.

In particular, the invention arises from an analysis of the limitation of the known solutions that are identified in a lack of control of the camera movements by the automatic camera head of the prior art, both for what pan and tilt are concerned, but also for objective adjustments in focus, zoom, and iris.

BRIEF DESCRIPTION OF THE DRAWINGS

The invention will be better understood with the aid of the description of an embodiment given by way of example and illustrated by the figures, in which:

FIGS. 2a and 2b show a ring actuator for setting an operating parameter of an objective such as focus, iris, or zoom.

DETAILED DESCRIPTION OF POSSIBLE EMBODIMENTS OF THE INVENTION

Figure 1:
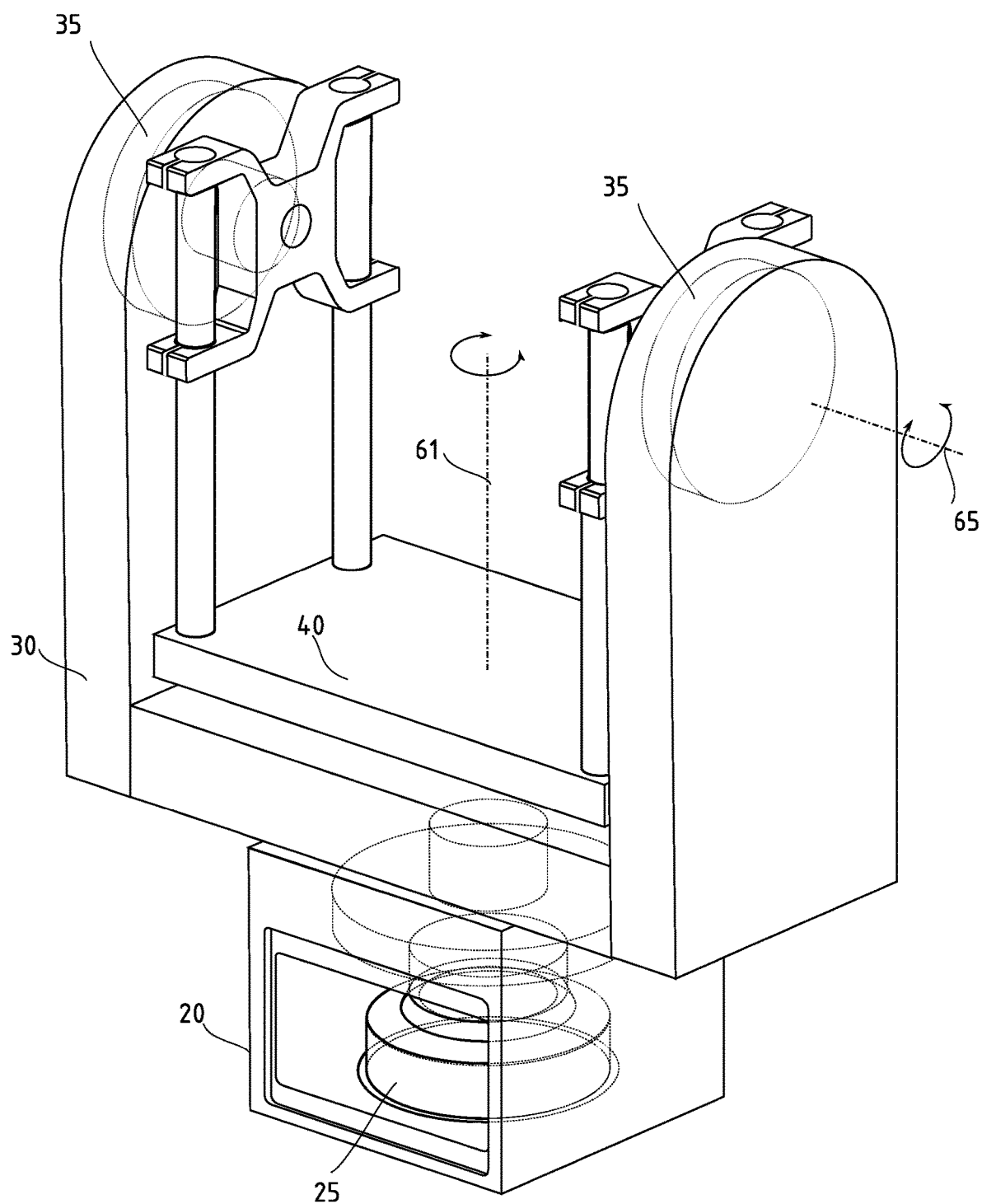
FIG. 1 shows a view of a camera head according to an aspect of the present invention.

As FIG. 1 illustrates, the invention relates to an automatic camera head for panning and tilting a video camera, comprising a base 20, that can be mounted on a fixed support such as a tripod, on a movable platform, or on a vehicle, possibly an automatic robot. The pedestal height of the tripod may also be settable by a suitable automatic control.

The base 20 has attached an intermediate element 30, also called "pan platform", that can be rotated about the pan axis 61. The rotation is determined by the motor 25 and the rotation angle is precisely captured and read by an encoder.

According to an important aspect of the invention the motor 25 is a brushless DC motor that drives directly the pan platform 30 without a timing belt. This solution has the advantage of being quiet and allow very fast rotation speed. The motor is driven by a specialized electronic driver that allows control of the robot both in speed and angular position, including the possibility of locking the motor at any desired angle. In a variant, a brushless DC motor drives pan platform 30 through a strain-wave gear or another low-backlash reduction.

The speed of the electric motor and the reduction ratio of the strain-wave gear are chosen in consideration of the desired panning angular speed. In a typical realization, the maximum panning speed may be of 180 degree/s, which is achievable with a motor speed of 3000 rpm and a 100÷1 reduction, but this is not an essential feature of the invention. The reduction ratio may be comprised between 20÷1 and 200÷1.

Figure 3:
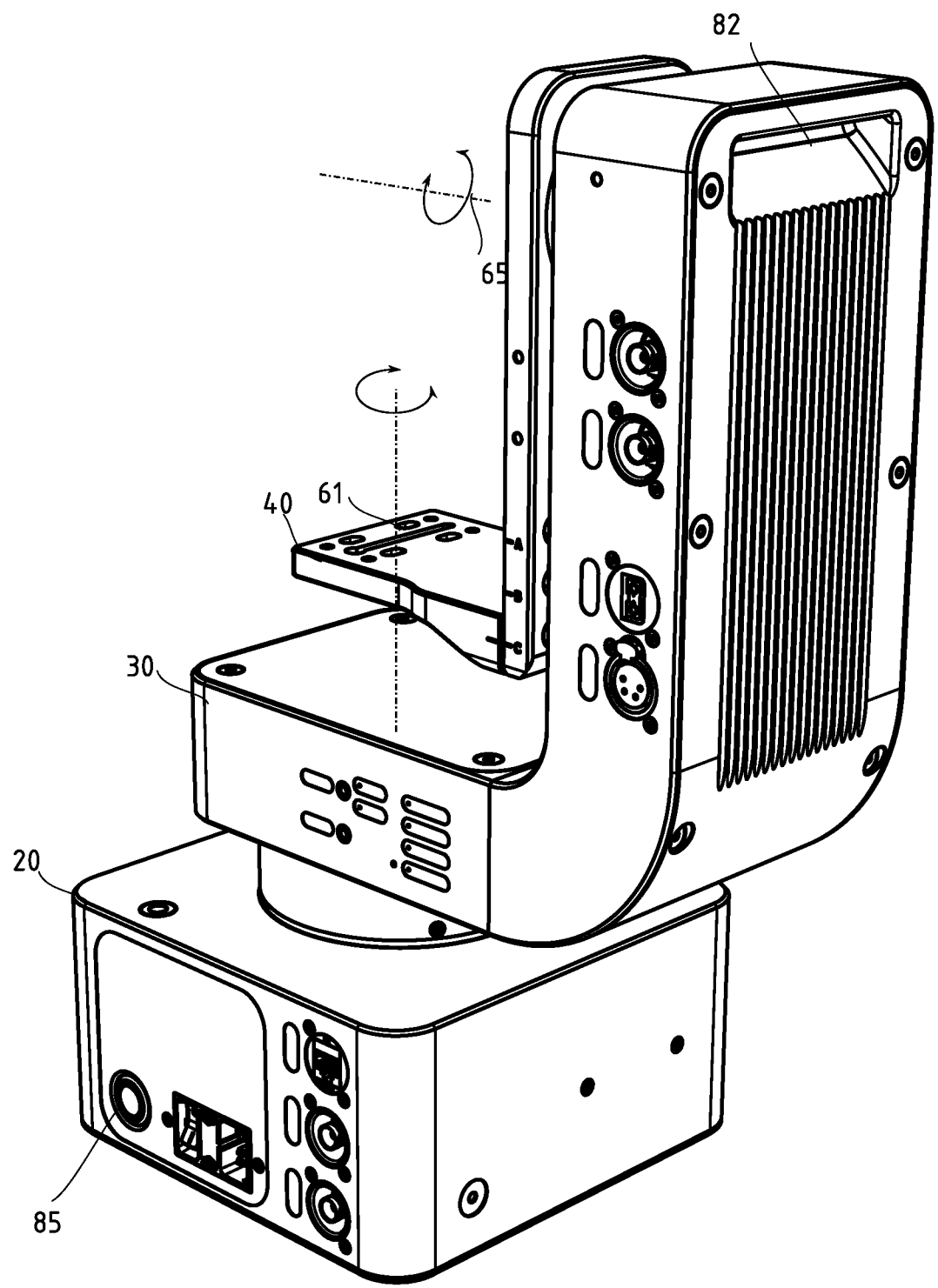
FIG. 3 illustrates a variant of the invention including a camera head with an L-shaped pan platform, a handle, and a safety switch.

The intermediate element 30 may have a "U" shape, as shown in FIG. 1, or a "L" shape, or any other suitable shape. The "U" shape allows to journal the tilt platform between two bearings, for superior stiffness. The "L" shape is lighter and easier to carry. An embodiment involving an L-shaped pan platform will be disclosed further on, in reference to FIG. 3.

The encoder yields a resolution of at least 100k points per revolution, or equivalently, better than 16 bits of resolution, and preferably more. 19-bit and 20-bit encoders, yielding more than 500 000, respectively more than 1 000 000 codes per revolution, have provided satisfactory results. This result can be obtained by an accurate interpolator digitizing two quadrature sinusoidal analogue signal generated by the encoder by one or more high-resolution ADC and performing the necessary trigonometric calculation in a specially-programmed FPGA. Other structures are however possible for the interpolator. The speed of the encoder must be high enough to capture the motion of the panning platform at maximal speed without errors.

Preferably the motor 25 and the axle supporting the intermediate element are hollow, to simplify cable routing.

The panning platform 30 is attached to a camera holder 40 that can rotate about a tilt axis 65, orthogonal to the pan axis 61. Conventionally, the pan axis is vertical, and the tilt axis is horizontal and, in the present disclosure, the terms "horizontal" and "vertical" are used to denote the conventional positions of the pan and tilt axis when the camera head of the invention is in operation, but the invention is not limited to this disposition and, indeed, the base 20 could be mounted on an inclined platform such that the axis 60 is sloping.

The rotation about the tilt axis 65 is guaranteed by one or two motors 35 and, again, the tilt angle is read by a high-speed encoder. As for the pan axis, the tilt motor or motors 35 are preferably DC brushless motors with a hollow axle, driving the camera holder directly, or through a strain-wave gear of suitable reduction. The nominal speeds for the tilt axis may be essentially the same as those of the pan axis, or slightly inferior. The instantaneous tilt angle is read by high precision encoders having a resolution comparable with that of the encoders on the pan axis, for example or 100k codes per revolution, preferably at least one million codes per revolution, and adequate speed.

A third axis for roll movements, orthogonal to pan and tilt axis, could also be added. The main purpose of the roll axis would be the compensation of misalignments, since deliberate roll movements are seldom used in cinematography. Accordingly, the angle limits, speed and dynamic properties of the roll axis can be considerably lower than those of pan and tilt axes.

FIGS. 2a and 2b relate to a ring actuator that is fixed to the camera holder 40 or to the camera itself by means of the clamp 125 and operates on a ring on the camera's objective by means of the gear 130. The purpose of this actuator is to act on any possible ring control of an optical objective, typically on an iris, focus, or zoom control.

The angle of the gear 130 is also read by a suitable encoder or deduced by step counting. Preferably, the ring controllers include a torque measurement unit that reads and makes available the mechanical torque on the ring. The torque measurement unit could be a suitable mechanical sensor, or else the torque could be derived from the electrical operating parameters of the motor 150. The speed required for the ring movements are generally lower than those needed for zoom and pan and the ring actuator may include a reduction means, like the timing belt 160, or a gearbox, or another suitable arrangement. The electronic unit 180 is arranged to drive the motor 150 and interface with the encoder.

Importantly, the control of the pan-tilt motions as well as of the objective rings are the task of a controller (not drawn) that has access to the angles measured by the encoders. In a preferred variant of the invention, the controller has a calibration mode that determines the physical limit of motion of the actuators, be they the pan-tilt actuators or the ring ones, by moving the respective motors and monitoring the torque to detect an increase that signals that the ring has been pushed to the end of its permitted range or, when the torque is not read directly, recording the physical limits of the actuator from the encoders.

In a further calibration phase, the controller determines a map between the setting of each actuator, especially the zoom ring, and the field of view of the objective. This is done, at each desired position of the ring, by taking two or several images of the same scene while panning/and or tilting the head. The angle of the head can be varied continuously or in steps, and the angle at which each image is captured is precisely known by means of the encoders.

An automatic vision software is used in this step of the calibration to identify key features in each image and pair them across images taken at different pan/tilt setting. In this way the software can determine the displacement of the key feature in the image for each angular change and ring setting, thus reconstructing the field of view and a pixel-angle relationship for each setting of the zoom ring. This mapping is used in an automatic tracking system to treat tracking problems in physical 3d space and not in 2d pixels of the image.

This feature is particularly advantageous because it allows a precise control of the field of view, by robotic means. In particular, nonlinearities between ring setting and focal length can be automatically accounted for and corrected.

The calibration can be extended also to the focus ring, by an automatic analysis of images taken at different focus setting, determining the distance of key features that are in sharp focus. This can be obtained either by taking an image that contain points whose distances are previously known, or by determining the distance of the key features by any other suitable means. If the camera is mounted on a dolly, a movable platform, or on an automatic pedestal, the distance of key points could be determined by parallax shifts between two images taken from two different position spaced apart by a known distance.

The mapping between focus ring angle and distance of focus is repeated for different setting of the iris.

The automatic calibration may include the determination and adjustment of dynamic parameters, by changing the angle of the pan rotation axis and/or of the tilt rotation axis, and capturing video data during the change of angle, by a video camera mounted on the camera holder. A processor analyses the video data to extract dynamic parameters, such as vibrations, jerkiness, and damping, possibly adapting a dynamic model of the camera/camera head assembly and determines an allowed range of dynamic parameters for the pan rotation axis and/or the tilt rotation axis based on the captured video data.

Importantly, the automatic calibration outlined above is executed after every readjustment or change in the camera rig (for example after changing a lens or adding a tele-prompter, or any other accessory). Preferably, the software resources determining the calibration are totally or in part embedded in the automatic head firmware, for fully autonomous operation.

In a preferred embodiment the automatic camera head of the invention is equipped with a modular platform for offline rigging platform attachable to the camera and releasably connected to the camera holder. The camera and lens actuators can be attached and fixed to the rigging platform which can be easily attached to the camera holder on the pan-tilt unit without tools According to another variant visible on FIG. 3, the intermediate element 30 of the automatic camera head of the invention is "L" shaped with a horizontal arm connected to the pan motor and a vertical arm connected to the tilt motor, and a handle 82 at the top end of the vertical arm. Advantageously, the handle 82 is easily reachable and above the centre of mass, such that the head can be easily lifted and carried.

Preferably, the camera head has a communication interface connectable to a computer or to a network of computers and arranged to drive the pan axis and the tilt axis and/or the ring actuators according to directives received from an external system. In a favourable variant the camera head has an input device, such as the button 85, and is arranged set the camera head in a manual state in which the motors are put in a zero-torque mode.

In the manual state, all the automatic movement are inhibited, and all the directives received from the communication interface are ignored or suspended. The pan and tilt axes, as well as other degrees of freedom of the camera are locked or may be moved manually. The button 85 is a safety feature, and preferably combined with appositive visual feedback, for example a light in the button or close to it that signals when the camera head is in the manual state, hence safe to approach.

Importantly, the button 85 allows to approach the camera and perform necessary manual adjustments without depowering or resetting the whole system, hence without losing an existing calibration state, which would be undesirable in a live production setup.

Figure 4:
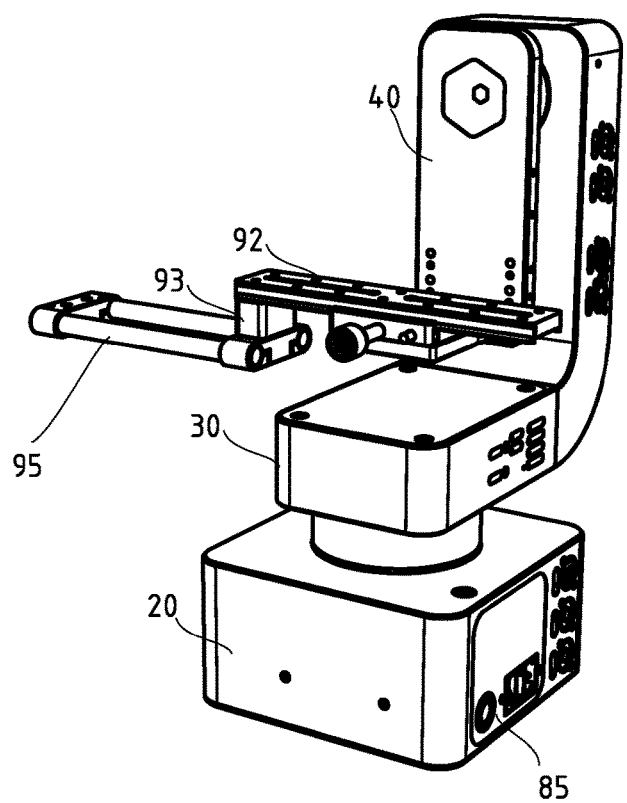
FIG. 4 shows a camera head with a detachable rigging platform.
Figure 5:
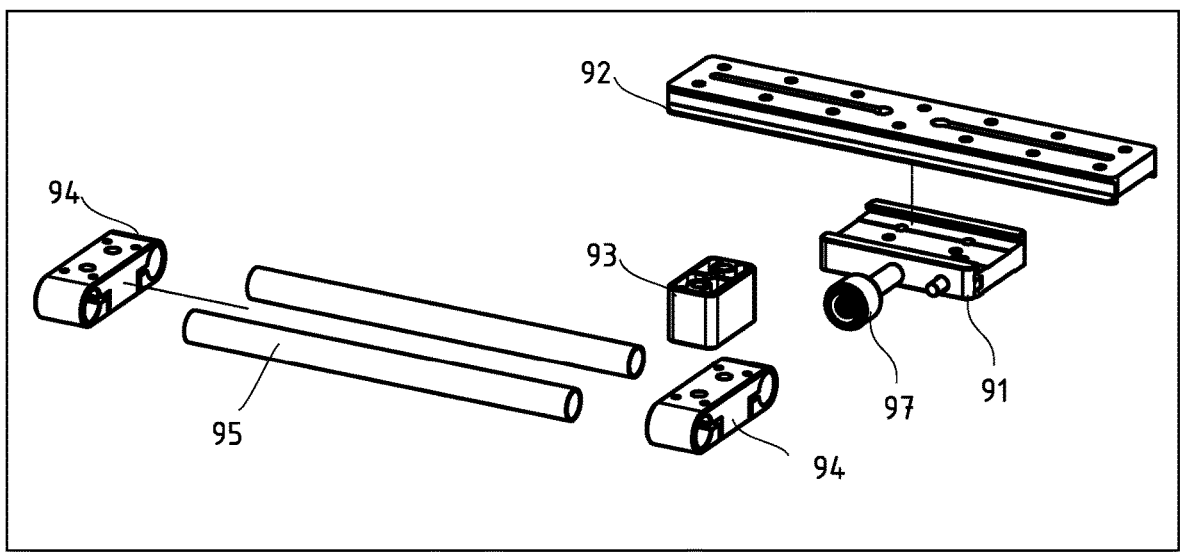
FIG. 5 illustrates the rigging platform in its constituents.

FIGS. 4 and 5 shows the offline rigging platform mounted on the camera head and disassembled in its constituents. The riffing platform includes a slide 92 arranged to slide linearly on the support 91. A pair of mating dovetail surfaces, or a similar arrangement of collaborating surfaces on the slide 92 and on the support 91 ensures smooth relative motion between these two parts. The support 91 is attachable to the tilt platform 40, and the slide 91 has slots, holes, or other suitable attachment points to receive and hold a video camera (not drawn).

The rigging platform includes an extension with two bars 95, held in a parallel configuration by the end-caps 94, into which they fit precisely. The bars 95 are used to attach one, two, or more ring actuators by the respective clamps 125 (see FIG. 2*b*). The spacer 93 can be changed, or stacked with other compatible spacers, to modify the vertical distance between the bars 95 and the optical axis of the camera, according to the needs, and specifically according to the diameter of the objective lens.

Advantageously, the support 91 is the only part that is permanently attached to the camera head, while the slide 29, with the associated bars 95, can be easily slid in and out and secured by the thumbscrew 97. In this manner, the operations of selecting the objective lens, mounting it to the camera, rigging the ring actuators, and engaging them with the lens can be carried out on the rigging platform, in a laboratory or in another convenient place, rather than on the set.

REFERENCE SYMBOLS IN THE DRAWINGS

20 base
25 pan actuator, pan motor and reducer
30 intermediate element, pan platform
35 tilt motors and reducers
40 camera holder, tilt platform
61 pan axis (vertical)
65 tilt axis (horizontal)
82 handle
85 safety button (command override)
91 support
92 slide
93 spacer
94 end-caps
95 bars
97 thumbscrew
120 ring actuators
125 clamp
130 gear
150 motor
160 reducer
180 electronic card

The invention claimed is:

1. An automatic camera head for panning and tilting a video camera, comprising a base, an intermediate element connected to said base and rotatable relative to said base about a pan rotation axis, a camera holder connected to said intermediate element and rotatable relative to said intermediate element about a tilt rotation axis orthogonal to the pan rotation axis, a pan actuator arranged to turn the intermediate element about the pan rotation axis, a tilt actuator arranged to turn the camera holder about the tilt rotation axis, wherein the pan actuator and/or the tilt actuator include DC brushless motors driving the intermediate element respectively the camera holder directly, the automatic camera head having at least one ring actuator arranged to act on a ring control of an objective of the camera, wherein said ring control is one of: zoom, iris, and focus and a control unit arranged to execute a calibration process with the steps of:
   moving the ring control by the ring actuator;
   determining limit angles in the ring control;
   determining the field of view of the objective at a plurality of positions of the ring control.

2. The automatic camera head of claim 1, wherein determining the field of view of the objective includes:
   take at least a first image and a second image of a scene by the camera at different pan and/or tilt angles;
   identify and pair key features in the first and second image;
   determine the field of view based on the separation of paired key features in the first and second images.

3. An automatic camera head for panning and tilting a video camera, comprising a base, an intermediate element connected to said base and rotatable relative to said base about a pan rotation axis, a camera holder connected to said intermediate element and rotatable relative to said intermediate element about a tilt rotation axis orthogonal to the pan rotation axis, a pan actuator arranged to turn the intermediate element about the pan rotation axis, a tilt actuator arranged to turn the camera holder about the tilt rotation axis, wherein the pan actuator and/or the tilt actuator include DC brushless motors driving the intermediate element respectively the camera holder directly having a control unit arranged to execute a dynamic calibration process with the steps of:
   cause a change of angle of the pan rotation axis and/or of the tilt rotation axis,
   capturing video data during the change of angle, by a video camera mounted on the camera holder,
   determine an allowed range of dynamic parameters for the pan rotation axis and/or the tilt rotation axis based on the captured video data.

4. An automatic camera head for panning and tilting a video camera, comprising a base, an intermediate element connected to said base and rotatable relative to said base about a pan rotation axis, a camera holder connected to said intermediate element and rotatable relative to said intermediate element about a tilt rotation axis orthogonal to the pan rotation axis, a pan actuator arranged to turn the intermediate element about the pan rotation axis, a tilt actuator arranged to turn the camera holder about the tilt rotation axis, wherein the pan actuator and/or the tilt actuator include motors driving the intermediate element respectively the camera holder, the camera head having at least one ring actuator arranged to act on a ring control of an objective of the camera and a control unit arranged to execute a calibration process with the steps of:
   moving the ring control by the ring actuator;
   determining limit angles in the ring control;
   determining the field of view of the objective at a plurality of positions of the ring control, wherein
   determining the field of view of the objective includes:
   take at least a first image and a second image of a scene by the camera at different pan and/or tilt angles;
   identify and pair key features in the first and second image;

determine the field of view based on the separation of paired key features in the first and second images.

5. An automatic camera head for panning and tilting a video camera, comprising a base, an intermediate element connected to said base and rotatable relative to said base about a pan rotation axis, a camera holder connected to said intermediate element and rotatable relative to said intermediate element about a tilt rotation axis orthogonal to the pan rotation axis, a pan actuator arranged to turn the intermediate element about the pan rotation axis, a tilt actuator arranged to turn the camera holder about the tilt rotation axis, wherein the pan actuator and/or the tilt actuator include motors driving the intermediate element respectively the camera holder, the camera head having a control unit arranged to execute a dynamic calibration process with the steps of:
cause a change of angle of the pan rotation axis and/or of the tilt rotation axis,
capturing video data during the change of angle, by a video camera mounted on the camera holder,
determine an allowed range of dynamic parameters for the pan rotation axis and/or the tilt rotation axis based on the captured video data.

6. An automatic camera head for panning and tilting a video camera, comprising a base, an intermediate element connected to said base and rotatable relative to said base about a pan rotation axis, a camera holder connected to said intermediate element and rotatable relative to said intermediate element about a tilt rotation axis orthogonal to the pan rotation axis, a pan actuator arranged to turn the intermediate element about the pan rotation axis, a tilt actuator arranged to turn the camera holder about the tilt rotation axis, wherein the pan actuator and/or the tilt actuator include DC brushless motors driving the intermediate element respectively the camera holder directly or via a strain-wave reduction gear, the automatic camera head comprising at least one ring actuator arranged to act on a ring control of an objective of the camera, wherein said ring control is one of: zoom, iris, and focus, and a control unit arranged to execute a calibration process with the steps of:
moving the ring control by the ring actuator;
determining limit angles in the ring control;
determining the field of view of the objective at a plurality of positions of the ring control.

7. The automatic camera head of claim 6, including a torque measurement unit delivering a signal indicative of the torque applied to the ring control.

8. The automatic camera head of claim 6, including angle encoders delivering a signal indicative of a pan angle between the base and the intermediate member and/or of a tilt angle between the intermediate member and the camera holder.

9. The automatic camera head of claim 6, comprising a detachable rigging platform attachable to the camera and releasably connected to the camera holder, wherein the has ring actuator is attached to the rigging platform.

10. An automatic camera head for panning and tilting a video camera, comprising a base, an intermediate element connected to said base and rotatable relative to said base about a pan rotation axis, a camera holder connected to said intermediate element and rotatable relative to said intermediate element about a tilt rotation axis orthogonal to the pan rotation axis, a pan actuator arranged to turn the intermediate element about the pan rotation axis, a tilt actuator arranged to turn the camera holder about the tilt rotation axis, wherein the pan actuator and/or the tilt actuator include DC brushless motors driving the intermediate element respectively the camera holder directly or via a strain-wave reduction gear, the automatic camera head comprising a control unit arranged to execute a calibration process with the steps of:
take at least a first image and a second image of a scene by the camera at different pan and/or tilt angles;
identify and pair key features in the first and second image;
determining a field of view of the camera based on the separation of paired key features in the first and second images.

11. The automatic camera head of claim 10, including angle encoders delivering a signal indicative of a pan angle between the base and the intermediate member and/or of a tilt angle between the intermediate member and the camera holder.

12. The camera head of claim 10, comprising a communication interface and an input device arranged to set the camera head in a manual state in which the motors produce no torque and in which directives received from the communication interface are ignored.

13. An automatic camera head for panning and tilting a video camera, comprising a base, an intermediate element connected to said base and rotatable relative to said base about a pan rotation axis, a camera holder connected to said intermediate element and rotatable relative to said intermediate element about a tilt rotation axis orthogonal to the pan rotation axis, a pan actuator arranged to turn the intermediate element about the pan rotation axis, a tilt actuator arranged to turn the camera holder about the tilt rotation axis, wherein the pan actuator and/or the tilt actuator include DC brushless motors driving the intermediate element respectively the camera holder directly or via a strain-wave reduction gear, having a control unit arranged to execute a dynamic calibration process with the steps of:
cause a change of angle of the pan rotation axis and/or of the tilt rotation axis,
capturing video data during the change of angle, by a video camera mounted on the camera holder,
determine an allowed range of dynamic parameters for the pan rotation axis and/or the tilt rotation axis based on the captured video data.

14. The automatic camera head of claim 13, including angle encoders delivering a signal indicative of a pan angle between the base and the intermediate member and/or of a tilt angle between the intermediate member and the camera holder.

15. The camera head of claim 13, comprising a communication interface and an input device arranged to set the camera head in a manual state in which the motors produce no torque and in which directives received from the communication interface are ignored.

* * * * *